United States Patent [19]

Stöckli et al.

[11] Patent Number: 5,198,056
[45] Date of Patent: Mar. 30, 1993

[54] METHOD AND DEVICE FOR ULTRASONIC WELDING OR PRINTING RIBBONS

[75] Inventors: Xaver Stöckli, Richterswil; Jürg Messerli, Samstagern, both of Fed. Rep. of Germany

[73] Assignee: SM Engineering AG, Wollerau, Switzerland

[21] Appl. No.: 888,265

[22] Filed: May 22, 1992

Related U.S. Application Data

[63] Continuation of Ser. No. 502,527, Mar. 30, 1990, abandoned.

[30] Foreign Application Priority Data

Apr. 5, 1989 [CH] Switzerland ............. 01254/89

[51] Int. Cl.⁵ .................. B31F 5/06; B32B 31/16
[52] U.S. Cl. .................. 156/73.1; 156/157; 156/159; 156/250; 156/256; 156/267; 156/502; 156/507; 156/510; 156/516; 156/517; 156/556; 156/580.1
[58] Field of Search ............ 156/502, 507, 510, 516, 156/517, 556, 250, 256, 512, 519, 73.1, 157, 158, 159, 267, 268, 580, 580.1, 580.2

[56] References Cited

U.S. PATENT DOCUMENTS

| | | | |
|---|---|---|---|
| 3,447,994 | 6/1969 | Abramson | 156/583 X |
| 3,460,666 | 8/1969 | Ploeger | 400/195 |
| 3,508,989 | 4/1970 | Lawrence | 156/154 |
| 3,687,787 | 8/1972 | Grand | 156/580 X |
| 3,821,048 | 6/1974 | Acker | 156/73.3 X |
| 4,018,955 | 4/1977 | Klaüke | 156/580.1 X |
| 4,121,964 | 10/1978 | Berkowitz | 156/507 OR |
| 4,369,779 | 1/1983 | Spencer | 156/159 X |
| 4,501,630 | 2/1985 | Kiuchi | 156/159 X |
| 4,589,943 | 5/1986 | Kimball | 156/267 X |
| 4,629,530 | 12/1986 | Becking | 156/580.1 X |
| 4,913,756 | 4/1990 | Shaposka | 156/507 X |

FOREIGN PATENT DOCUMENTS

1935572 4/1970 Fed. Rep. of Germany .

Primary Examiner—David A. Simmons
Assistant Examiner—J. Sells
Attorney, Agent, or Firm—Schweitzer Cornman & Gross

[57] ABSTRACT

Known methods and devices for overlap-welding of printing by means of ultrasonics have been developed further to enable problem-free use, particularly with wire printers also having thin wires, and to enable welding of multi-color ribbons. The invention also permits more durable components. In the method according to the invention, the printing ribbon to be joined is retained in a non-overlapping fashion on movable plates, preferably by means of a vacuum, and is severed by a cutter, preferably by means of an ultrasonic sonotrode and cutting anvil, and is then moved so that the ribbon ends are in overlapping position, and then welded, preferably with a structured part of a sonotrode on a wielding anvil which is likewise structured. A device according to the invention has two plates with ribbon-retaining means, a cutter, and a joiner, such as a welder, for joining the two ribbons ends. The plates are movable to at least two positions suitable respectively for the cutting and joining functions of the machine. A device for accomplishing the method may utilize standardized components which are usual in trade, is accordingly disturbance-free and may be produced economically and guarantees high production rates.

7 Claims, 6 Drawing Sheets

METHOD AND DEVICE FOR ULTRASONIC WELDING OR PRINTING RIBBONS

This is a continuing data of U.S. Ser. No. 502,527 filed on Mar. 30, 1990, now abandoned.

BACKGROUND OF THE INVENTION

This present invention relates generally to a method and device for manufacturing printer ribbons formed in a continuous loop within a cartridge. More specifically, the invention relates to a method and device for joining the two ends of a ribbon to form it into a continuous loop, by providing for durable overlap-welding by means of ultrasonics.

Methods and devices for ultrasonic welding of printing ribbons are known whereby a joint is produced by overlapping the ends of the ribbon cross-wise, and then welding the ends as taught in U.S. Pat. No. 3,821,048 to Acker and U.S. Pat. No. 4,629,530 to Becking. In practice, this type of welding of the ends of the ribbon has proved disadvantageous with respect to the structure of the ribbon ends and the life of the ribbon. The joint or weld thus produced has proven weak and has also been found to interfere with print quality when the printer strikes the joint in the ribbon. Ribbons joined by this method have proven particularly troublesome as the number of pins employed on the print heads of modern dot matrix printers has increased to 24 and even 48 wires. This increase in wires increases the stress on the joint. Further, the increase in number of wires has corresponded to a decrease in their thickness, and the thinner wires can be damaged by repeatedly striking the joint. Multicolor ribbons may also not be welded in accordance with Acker or Becking because the colors become blurred in the areas at the joint. Further, the welding devices of both Acker and Becking necessitate a multitude of specially manufactured, costly mechanical and pneumatic components and are accordingly time and labor-intensive in maintenance.

U.S. Pat. No. 4,018,955 issued to Klaüke discloses a method of achieving colorabsorbing joints. Klaüke teaches welding the overlapped printing ribbons by laying a metal grid above the weld under a sonotrode, and laying another under the weld on the anvil to produce a weld with ink-bearing cells which is suitable for single-color or multi-color continuous printer ribbon.

In one aspect, an object of the invention is to create a method and a device which will provide for automated joining of ends of ribbons by means of durable overlap welding in a manner which is more durable and interferes less with printer quality and permits precise welding of multi-color ribbons. In a second aspect, an object of the invention is to invent a device for carrying out the method which utilizes, to a large extent, commercial standard parts and appliances which are correspondingly simple and inexpensive to maintain. In a third aspect, an object of the invention is to provide an improved means for retaining the ribbon ends in precise alignment while being cut and joined. In a fourth aspect, an object of the invention is to provide a quicker and more convenient means for removing the waste ends of ribbons left after the cutting process. In a fifth aspect, an object of the invention is to provide a means for producing a weld of a length and strength suitable for the size and type of ribbon being joined.

SUMMARY OF THE INVENTION

The present invention relates to a method and device for providing durable overlap welding of two ends of ribbon to form a continuous loop. In a first and second step of the method, the ends to be welded are placed and then retained on a first and second plate. In a third step of the method, the ends are cut. In a fourth step of the method, the plates are moved to bring the ends together into a position where they overlap. In a fifth step, the ends are welded.

The device according to the invention consists of a first and second plate which can be moved to at least one of two positions. The plates have a retaining means suitable for retaining the ribbon ends. The invention also consists of a cutter for cutting the ribbon ends. When the plates are in a first position, the ribbon ends are in a suitable position for the cutter to cut the ends. The plates can then be moved to a second position where the ends are suitable for joining. A joining means then joins the ends. In a further embodiment, a vacuum may be applied to retain the ribbon ends in position and to remove the waste ends after cutting.

The invention permits various embodiments. A preferred embodiment is depicted in the drawings and subsequently described.

DESCRIPTION OF PREFERRED EMBODIMENT

An embodiment of the present invention will now be described by way of example with reference to the aforementioned drawings.

Figure 1:
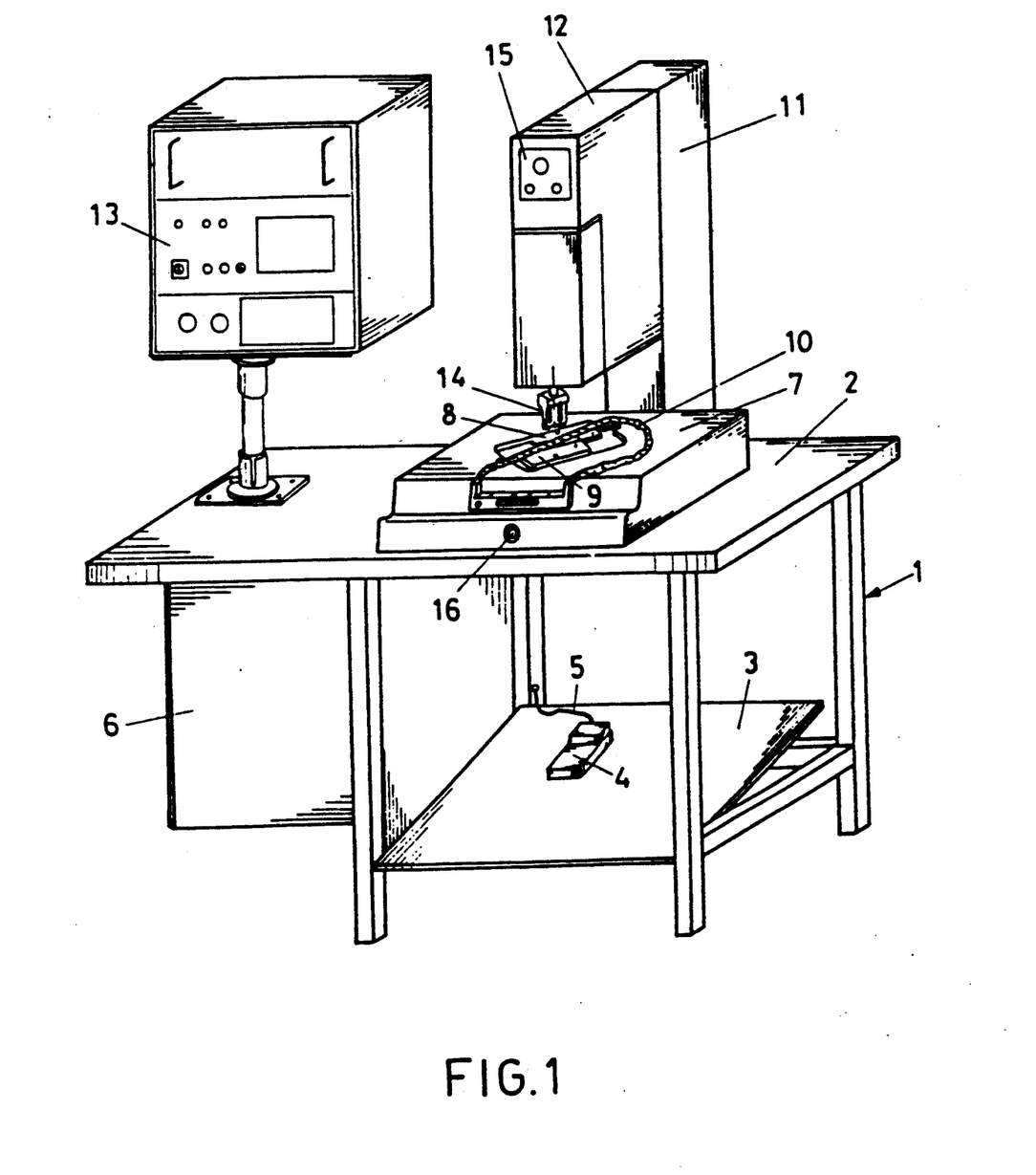
FIG. 1 is a perspective view of the cutting and welding device according to the invention.

As is shown in FIG. 1, an embodiment of the present invention includes a table 1, which has a table plate 2 and a foot plate 3 which serves as a foot support and has a foot switch 4. The foot switch 4 is connected via a control cable 5 to a pneumatic control cabinet 6, which is attached to the side of the table 1.

On the table plate 2 is a casing 7 housing two roller-type plates 8, 9 upon which a printing ribbon 10 is laid which is to be welded. On the back of the table 1 is a sturdy pillar 11 which carries an ultrasonic converter 12. On the left-hand side of the table 1 is a modular control box 13 consisting of standard elements with a signal generator, microprocessors and input panels.

Above the roller-type plates 8, 9 is a sonotrode 14. The feed-adjustment, i.e. presetting the speed and the path of travel of the sonotrode 14, is positioned with the control 15. At the front of the casing 7 of the roller-type plates 8, 9, an emergency control switch 16 may be seen.

Figure 2:
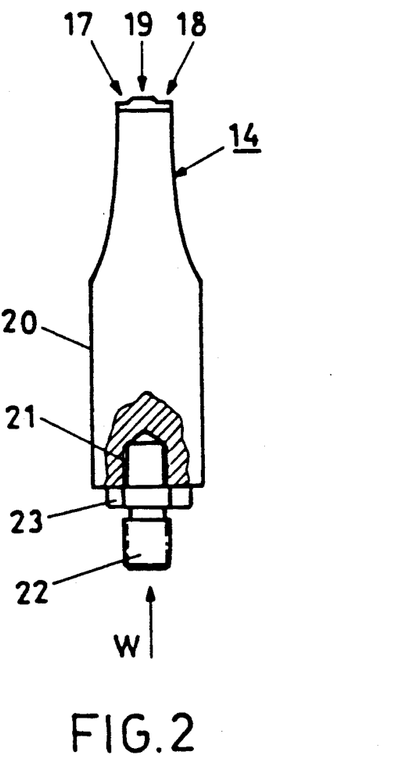
FIG. 2 is a side elevation of a sonotrode for welding and cutting.

In FIG. 2, the sonotrode 14 of a standard ultrasonic-welding apparatus has been enlarged with respect to FIG. 1. This sonotrode 14 has cutting areas 17, 18 at its front end and a structure 19 in the central area on its front end.

The depicted active direction W corresponds to the vertical axis. A relatively narrow working part includes the structure 19 and the cutting are as 17, 18 which are integrally formed to a thickening 20 which has a threaded bore hole 21 in the other end of the sonotrode 14. In this threaded bore hole 21 is a coupling screw 22 with a hexagon 23, the coupling screw 22 serving for the mechanical connection of the sonotrode 14 with the ultrasonic booster and converter 12 (FIG. 1).

Figure 3:
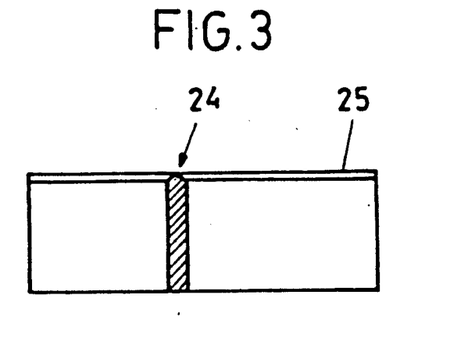
FIG. 3 is a front view of a cutting anvil.

Shown in FIG. 3 is a cutting anvil 24 which is located between the roller-type plates 8, 9. This cutting anvil 24 has a symmetrical cutting edge 25 which includes an angle of 120 degrees. The profile of the cutting anvil 24 may be seen in the marked cross-section.

Figure 4:
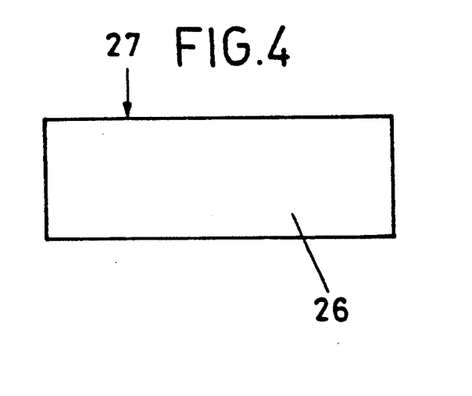
FIG. 4 is a front view of a welding anvil.
Figure 5:
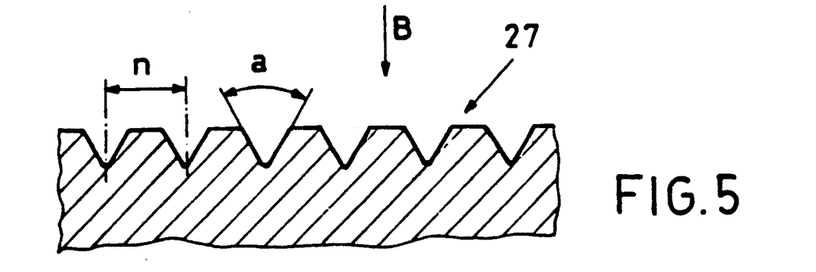
FIG. 5 is a cross-sectional view of the characteristic micrograph of the structure on the sonotrode and the welding anvil.
Figure 6:
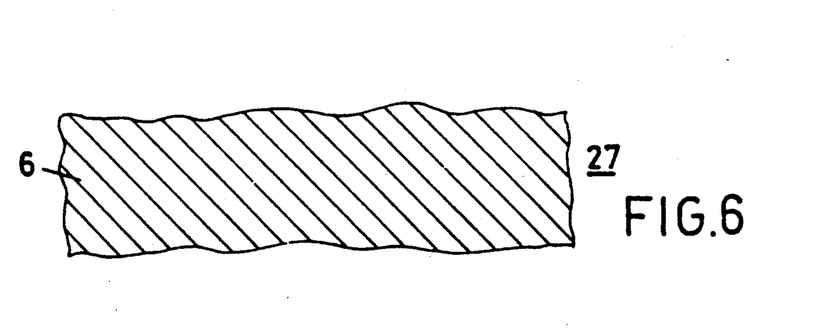
FIG. 6 is a top view of a section of the structure according to FIG. 5.

Shown in FIG. 4 is a welding anvil 26. The surface of welding anvil 26 can be flat but in a preferred embodiment has parallel channels as shown in FIG. 5, whereby the spacing amounts to n=0.4 mm and the angle to a=60 degrees. As shown in FIG. 6, in a preferred embodiment, the channels are cut in structure 27 by precision grinding at an oblique angle, for instance 45°. Another suitable embodiment has been developed whereby structure 27 has a second set of channels intersecting the first set in a grid-like fashion.

When the structure 27 of welding anvil 26 has one set of channels as shown in FIGS. 5 and 6, it is preferred that the structure 19 of the sonotrode have a similarly channeled surface. In the preferred embodiment, the sonotrode is oriented respective to the welding anvil so that the channels of structure 19 are not parallel with those of structure 27 of welding anvil 26. In this configuration, the ribbon ends between the structure 19 and welding anvil 26 will be welded only at spaced welded regions, which are those areas of intersection between the raised surface of the structures 19 and 27. It is preferred that the channels of the structures be oriented to intersect at approximately a 90° angle.

In another embodiment, the surfaces of both structures 19 and 27 have two sets of intersecting channels. In this embodiment it is preferred that the sonotrode and welding anvil be oriented so that the raised surfaces of structure 19 align with the raised surfaces of structure 27.

The sonotrode 14 consists of 155 CrVMo12.1; the cutting anvil 26 is made of stellite (standard hard metal). Since the sonotrode and the cutting anvils do not come into direct contact with each other during welding, their tool-life is very long. If wide printing ribbons are used and/or ribbons which are to be cut at an oblique angle, it is recommendable to use several welding anvils which are arranged in a row and to cut each ribbon separately, i.e., one after the other.

The surface structures according to claim 16 effect welds which are particularly soft and thus abrasive-resistant and only slightly plastized, the welds guaranteeing in addition perfect print. The welds produced according to the invention are so soft and seeped with color that they may be used problem-free in printers with 24 or 48 wires and in printers with endless printing steel strips without, for example, the very thin wires being mechanically too overburdened and without clear alterations of the print being ascertainable in the area of the weld. In addition, the service-life of the printing ribbons or the welds is considerably increased. Cross-wise structures have proven especially advantageous.

The invented method is also suitable for rectangularly cut printing ribbons as well as for ribbons which are obliquely cut. The invention enables the ends of the printing ribbons to be cut, overlapped and welded very quickly.

Figure 7:
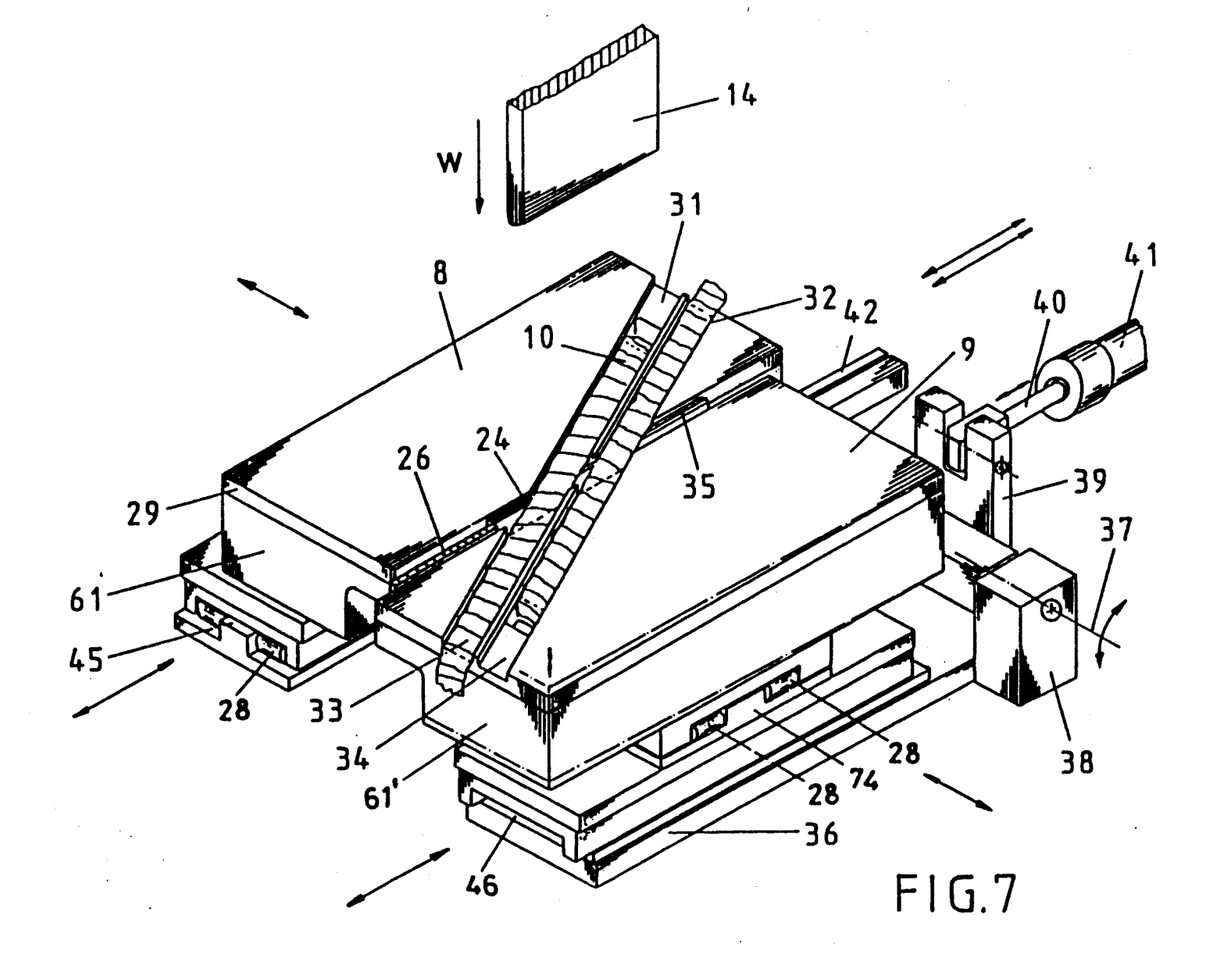
FIG. 7 is a perspective vie of the device in an essential area of the invention showing a first stage of operation in which the ends of the printing ribbon are severed.

FIG. 7 shows both of the roller-type plates 8, 9 located underneath the sonotrode 14, FIG. 7 in respect of FIG. being greatly enlarged. The roller-type plate 9 has rollers 28 which are indicated schematically, roller-type plate 8 also having rollers 28, the rollers 28 enabling the roller-type plates 8, 9 to be easily moved. The rollers 28 of the roller-type plate 8 are for its longitudinal movement; the rollers 28 of the roller-type plate 9 for its transverse movement. Appropriate rollers are provided for each of the other directions of travel. The directions of travel are shown by arrows. The use of standard roller-type plates enables extremely precise production and minimizes the expenditure for mechanical moving-elements.

The roller-type plates 8, 9 which preferably face each other at a mutual distance of 15 mm, form supports for the printing ribbon 10 with their base plates 61, 61'. Both the roller-type plates 8, 9 have two guide grooves each 31, 32 and 33, 34 resp., which run parallel on the top side of a cover plate 29, 30. The printing ribbon 10 is, at first, inserted into the guide grooves 31, 33 and 32, 34 in such a way that the ends come to rest in a position parallel to each other so that one end rests in guide groove 31 and the other end in guide groove 34. Located between the roller-type plates 8, 9 are the cutting anvil 24 and a second cutting anvil 35 as well as a welding anvil 26. These cutting anvils 24, 35 and the welding anvil 26 are located on the same tool carrier 42. In the position shown in FIG. 7, both of the roller-type plates 8, 9 are parallel to each other and are aligned with their broadsides. The ends of the printing ribbon 10 may be separated by lowering the sonotrode 14 onto the cutting anvil 24.

To be seen further in FIG. 7 is that the roller-type plate 9 is located on a base plate 36 which may be pivoted around a pivot axis 37, the pivot axis 37 being positioned in a component 38 which is secured to a casing. This base plate 36 takes the shape of an angle section and has a leg 39 which points in an upwards direction on the upper end of which a piston rod 40 of a lift cylinder 41 is hinged. If the piston rod 40 moves into the lift cylinder 41, the base plate 36 is pivoted in clockwise direction around the pivot axis 37. As a consequence, after the ends of the printing ribbon 10 have been severed, the end which protrudes over the guide groove 33 towards the roller-type plate 8 attains a higher position than the end of the ribbon in the guide groove 32.

Figure 8:
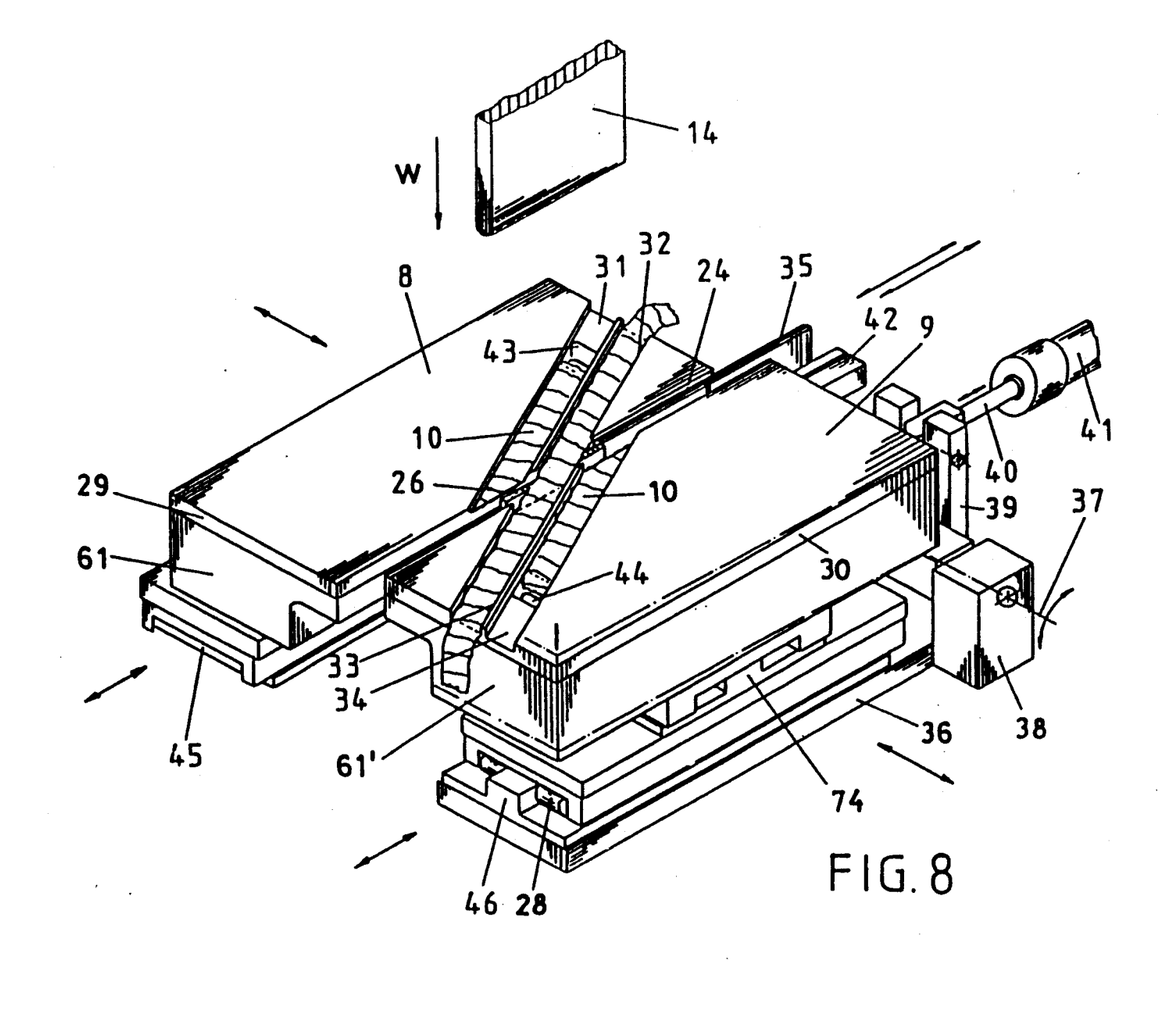
FIG. 8 is a perspective view of the area according to FIG. 2 showing a second stage of operation in which the end portions may be welded together.

After the roller-type plate 9 has been pivoted around the pivot axis 37, the roller-type plate 8 and the roller-type plate 9 are moved (by means not shown) on a guideway 45 and 46 so far to the left or to the right respectively, as seen in FIG. 8, till the guide groove 32 of the roller-type plate 8 is aligned with the guide groove 33 of the other roller-type plate 9. The roller-type plate 9 may then be pivoted back into its starting position around its pivot axis 37. This position of the roller-type plates 8, 9 is shown in FIG. 8. In this figure, the ends of the printing ribbon 10 facing each other and protruding over the edge of the roller-type plates 8, 9, lie on top of each other.

In FIG. 8, it may be seen that the tool carrier 42, holding the cutting anvils 24, 35 and the welding anvil 26, is moved out of the position shown in FIG. 7 so far backwards till the welding anvil 26 is aligned with the sonotrode 14. After the sonotrode 14 has been lowered onto the printing ribbon 10 above the welding anvil 26, the overlapping ends of the printing ribbon 10 may be welded together. The method and device according to the invention allow oblique joins of printing ribbons in a region from up to 90 degrees to 30 degrees. Thus, printing ribbons containing only a very slight amount of thermoplastic may also be securely welded due to the longer welding seam or the longer overlap.

A further feature revealed by FIG. 8 is that in each of the guide grooves 31, 34, a large passage 43, 44 is provided. These passages 43, 44 are connected to a vacuum source (not shown) for example with a usual vacuum pump. Thus, the waste ends, which arise due to cutting of the ribbon, may be removed through these passages 43, 44.

In the mass production of printing ribbons, the use of a vacuum to suck up the severed end portions of the ribbons has proved worthwhile. This process eliminates the use of costly mechanical means which are prone to disturbance.

Both of the roller-type plates 8, 9 are not only movable in a longitudinal direction on the guideways 45, 46 but also in a transverse direction to the latter, in a way similar to a compound slide. This sort of cross-rail 74 may be seen in FIG. 8. This transverse mobility is necessary so that the roller-type plates 8, 9 may approach each other after the ends of the printing ribbon have been cut and that hereby the desired overlap of the ends of the printing ribbon is achieved.

Figure 9:
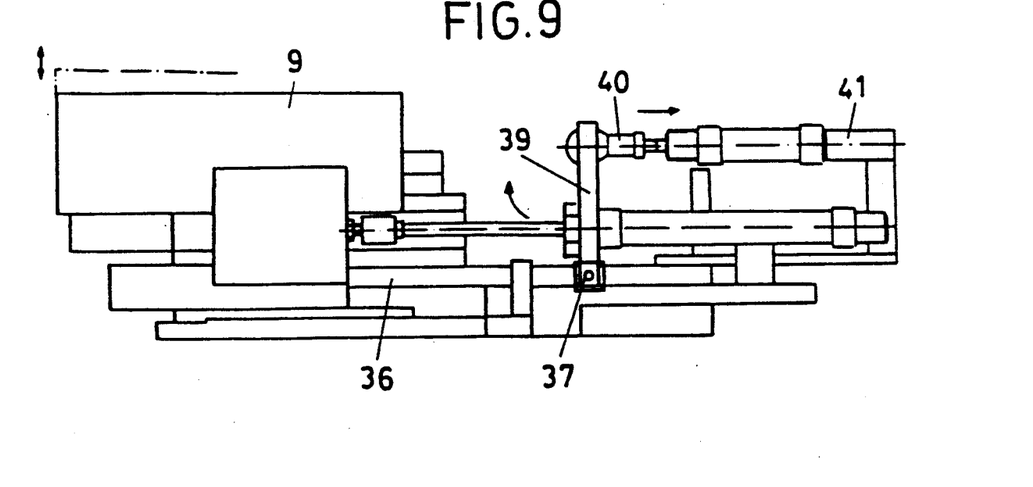
FIG. 9 is a side elevation of the device according to the previous figures.

FIG. 9 clarifies in addition how the base plate 36 which carries the roller-type plate 9 is arranged so as to be pivotable around the pivot axis 37. To be seen further in this figure is the lift cylinder 41 which engages with the leg 39 with its piston rod 40. In the left part of the drawing, the upper edge of the roller-type plate 9 in indicated in dashes and dots, the roller-type plate 9 being located in an upper pivot position.

Figure 10:
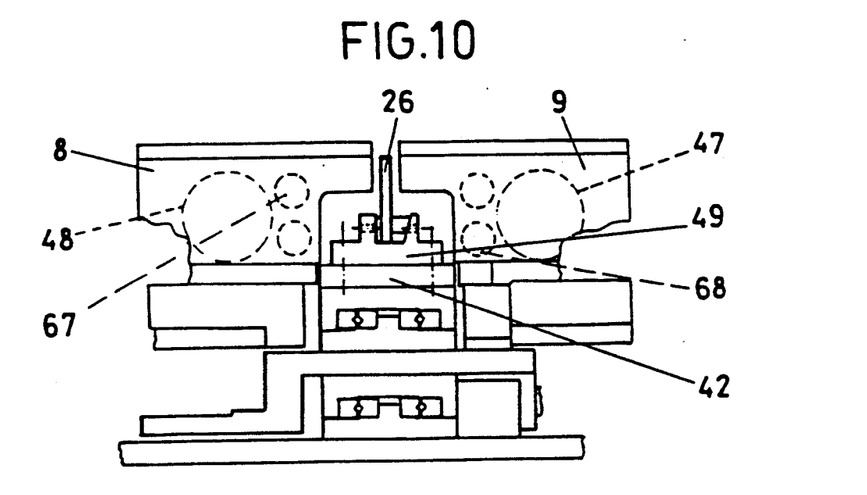
FIG. 10 is a side elevation of FIG. 9 turned through 90 degrees.

In the side elevation according to FIG. 10, both the roller-type plates 8, 9 may be seen and the tool carrier 42 situated between the latter which carries the welding anvil 26. Furthermore, FIG. 10 shows that each roller-type plate 8, 9 has a vacuum connection 47, 48, represented in broken lines, which is connected to the passages 43, 44, shown in FIG. 8, so that the severed ends of the ribbon may be sucked up via these vacuum connections 47, 48.

Figure 14:
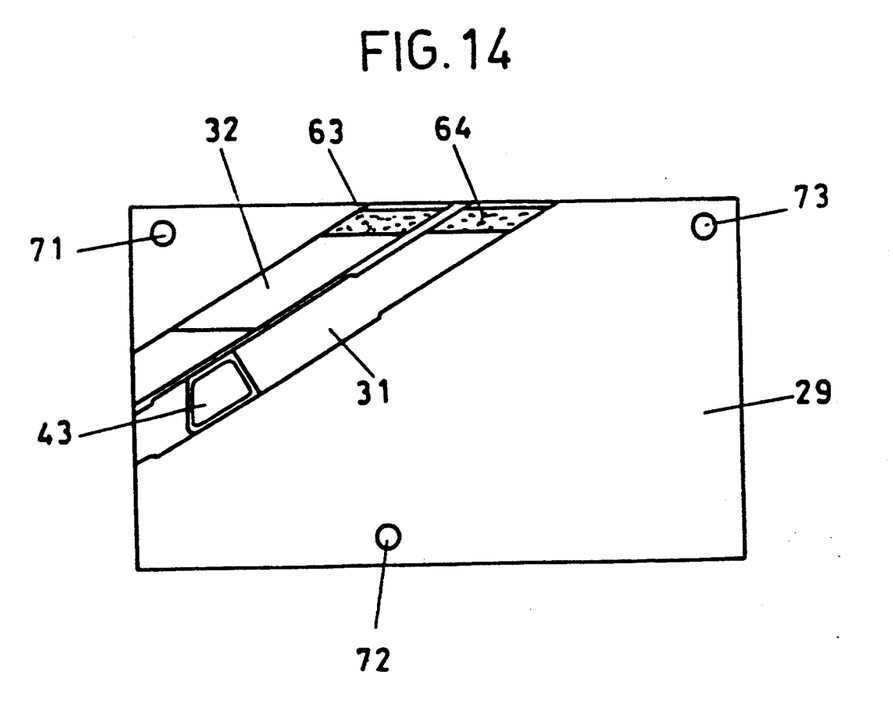
FIG. 14 is a top view of a cover plate which is to be placed on the based plate.

Also represented in FIG. 10 in broken lines are two further vacuum connections 67, 68 which are considerably smaller in diameter than vacuum connections 47, 48. Suction intakes 63, 64, shown in FIG. 14, are connected to a vacuum via these vacuum connections 67, 68. The suction intakes 63, 64 are provided at the ends of the guide grooves 31, 32, 33, 34 which face each other and serve for holding the printing ribbon 10 securely in the guide grooves by means of suction. The arrangement allows the printing ribbon to be optimally secured without requiring any sort of hold-down. Suction intakes in the form of standard finely woven material have proven especially suitable.

The different tasks of holding the ends of the printing ribbons while cutting and welding on the one hand and removing the severed ends of the ribbons on the other hand may be optimally carried out if the passages and the small suction intakes are so formed that they might be connected to independent vacuum sources.

Figure 11:
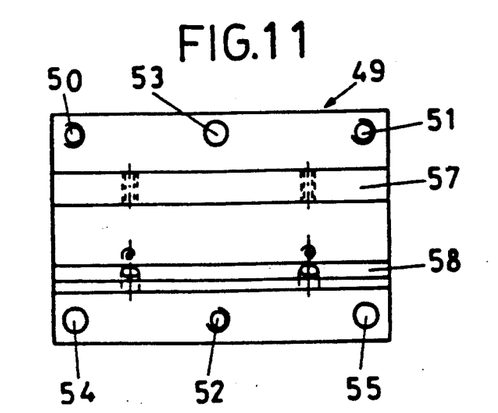
FIG. 11 is a top view of a component of the device for holding the cutting anvil or the welding anvil.

The cutting anvil and the welding anvil may be assembled as one component or, in a manner which is extremely advantageous, on a support ledge. To be seen further in FIG. 10 is that the welding anvil 26 is held in a support ledge 49 of the tool carrier 42 so as to be adjustable. The preferred structure of the support ledge 49 is revealed in the FIGS. 11 and 12. This support ledge 49 has two threaded boreholes 50, 51 in one side of a floor area and between these, in the opposite side, has a threaded borehole 52. Provided between the threaded boreholes 50, 51 of the first side is a through hole 53. In the other side are two corresponding through holes 54, 55 of the support ledge 49 which are situated in such a way that the threaded borehole 52 is in a position between these through holes 54, 55.

Figure 12:
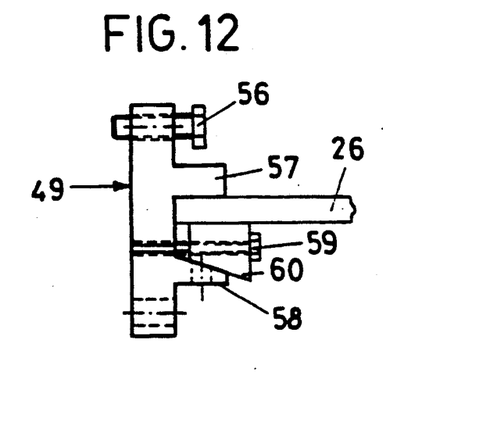
FIG. 12 is a side elevation of the holding component with a welding anvil inserted.

The through holes 53, 54, 55 serve for the passage of fastening screws (not shown). In each of the threaded boreholes 50, 51, 52 an adjusting screw 56, shown in FIG. 12, is to be screwed. This allows the support ledge 49 to be pivoted into any position whatsoever to enable alignment of the welding anvil 26 and the cutting anvils 24, 35, held by the support ledge 49, into a position relative to the sonotrode 14 before the support ledge 49 is tightly screwed. FIG. 12 shows by example of the welding anvil 26 that the latter is clamped between webs 57, 58 of the support ledge 49. The welding anvil 26 is fastened with the help of clamping screws 59 and a clamping wedge 60.

The holding components enable particularly simple and exact alignment of the welding anvil and the cutting anvil, and permit precise operation and, by reducing incidences of contact between the sonotrode and the anvils, serves to render both extremely durable.

Figure 13:
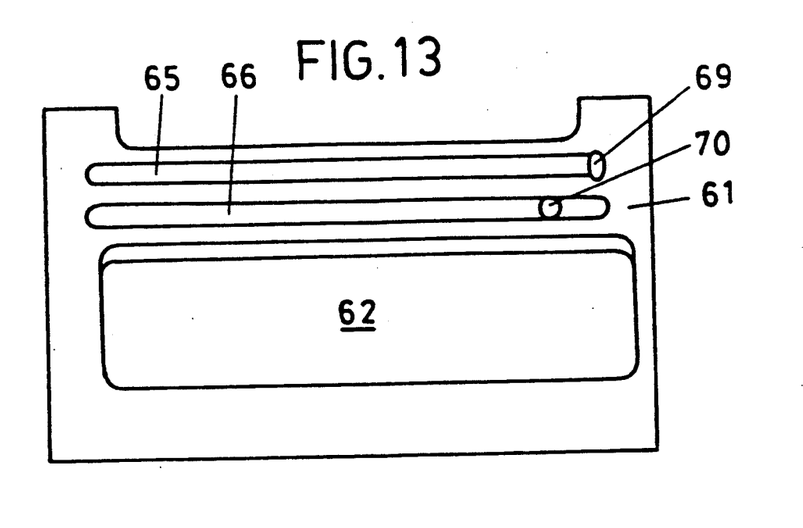
FIG. 13 is a top view of a base plate of a roller-type plate of the device.

In FIG. 13 a top view of a base plate 61 is shown, the base plate 61 having a trough-like vacuum duct 62 which is open towards the top and is connected to the vacuum connection shown in FIG. 10. In front of the vacuum duct 62 are ducts 65, 66 which are connected to the vacuum connection 67 (FIG. 10) via vertical bores 69, 70. The cover plate 29, shown in FIG. 14 as a separate component, is lowered onto the base plate 61 from above whereby the suction intakes 63, 64 and the passage 43 are connected to a vacuum. Not shown are fastening screws provided for this purpose, the fastening screws being screwed into the base plate 61 through holes 71, 72, 73 in the cover plate 29.

In view of this discussion, the operation of a preferred embodiment is easily understood.

While cutting the printing ribbon, the movement of the sonotrode is stopped electrically if a galvanic contact exists between the sonotrode 14 and the cutting anvil 24 or 35. The contact pressure of the sonotrode 14 is preferably limited to 1.25 bar and according to the toughness of the printing ribbon allows variations between 1.0 and 2.0 bar. The ends of the printing ribbon 10 severed in this way have an undamaged and thermally sealed cutting site.

The cut-off ends are sucked up by application of a vacuum as previously described and fall into a container (no shown) which is separated off by an obstacle.

The roller-type plate 9 is raised, as previously described, by being pivoted for approximately 5 mm on the side which faces the other roller-type plate 8 and the roller-type plate 8 is moved into the position shown in FIG. 8. The roller-type plates 8, 9 finally move in a longitudinal direction for 3 mm or 6 mm. The roller-type plate 9 is then pivoted back into its starting position again so that overlapping occurs.

Simultaneously, the cutting anvil 24 is extended in a longitudinal direction; the welding anvil 26 follows the cutting anvils 24 and 35 and thus comes to rest under the overlap-site.

The sonotrode 14 moves once again out of its starting position in active direction W, ultrasonics are then admitted and the sonotrode 14 is moved with 3.0 bar onto a mechanical stop (not shown) so that between the welding anvil 26 and the sonotrode 14, a space of 0.8 to 1.5 times the thickness of a single ribbon is produced. This adjustment may be achieved very precisely by using micrometer screws and is optimized according to the quality of the weld achieved or the print quality demanded on the weld respectively. The ultrasonic energy supplied is likewise adjusted by an energy window on the control of the ultrasonic converter. In the present example the space is set for the thickness of a single ribbon.

In the preferred embodiment, all the movements are achieved with standard pneumatic components (Festo Pneumatic AG, D-7301 Berkheim). Serving as roller-type plates are roller-type plates with backlash-free rollers in a cage (Firm Schneeberer, CH-3360 Herzogenbuchsee) and more exactly, serving the purpose of moving the guideways on the longitudinal axis are roller-type plates of the type NK2-125, two of the type NK3-55 for the transverse movement and two further NK3-205 for the movement of the anvils on the longitudinal axis.

Further in the preferred embodiment, the ultrasonic devices used are also standard (Branson Sonic power SA, CH-1227 Carouge, Model 947 AE or Telsonic Model 2500, Telsonic AG, CH-9552 Bronschhofen) and operate with an ultrasonic frequencey of 40 kHz or 36 kHz at a maximal generator capacity of 1000 Watt in the system of operation with constant preselected welding energy control. The temporal course of the application of ultrasonic-welding energy is controlled by means of microprocessors in a commonly known manner. The fine setting of the stop for the path of the sonotrode 14 in active direction W and of the overlap are attained by means of a so-called built-in micrometer (Tesa ETALON, Tesa SA, CH-1020 Renens).

The vacuum appliances preferably used for sucking the ends of the printing ribbon 10 in and up are likewise standard (side-channel compressor and airmouver; Rietschle, Hausammann & Co. AG, CH-8045 Zurich or Wabco Westhinghouse AG, CH-3018 Bern).

The device according to the invention may be operated reliably by unskilled workers and enables high production rates with lowest amounts of lost-time due to maintenance etc.

The method according to the invention permits the construction of the most different machine-technological variants. For example, the guides for the printing ribbons may be constructed on the roller-type plates so as to be easily exchangeable; likewise, universal guides may be made for printing ribbons of different width by means of adjustable side plates. The movements, controlled in the example of the embodiment by means of micrometer screws, may be digital using standard components and could also be set via servomotor. The end positions of the separately moving parts could be controlled likewise via standard, so-called inductive stop-indicators.

The method and the device are conceived in such a way that they may be expanded to a fully automatic operation system by employing handling-systems and-/or appropriate robots.

What is claimed is:

1. An apparatus for joining first and second ends of a printer ribbon, comprising first and second plates each having an adjacent edge spaced from and parallel to the adjacent edge of the other; retaining means for holding said first and second ribbon ends in predetermined parallel, non-collinear positions on said plates at an oblique angle to said adjacent edges; means for retaining said plates in a first position in a plane and a second position in a plane; means for first rotating one of said plates out of the plane defined by the first position and then moving said one of the plates by linear and rotation motion such that the ribbon ends overlap and the plates are in the second position; a sonotrode; a cutting anvil between said first and second plates cooperating with said sonotrode for cutting said ribbon ends at a common oblique angle when the plates are in said first position; and a welding anvil between said edges and positionable in alignment with the sonotrode for welding said ribbon ends when the plates are in said second position.

2. The apparatus of claim 1, wherein said retaining means for said ribbon ends comprise guide grooves in said plates having suction passages to permit suction to be applied to the ribbon ends to retain them in position.

3. The apparatus of claim 2, wherein the structure of said welding anvil cooperates with the structure of said sonotrode to weld the overlapped ribbon ends in a pattern of spaced welded regions.

4. The apparatus of claim 1, wherein said plates comprise means for repositioning the plates along parallel axis, said means for rotating one of said plates comprising a pivotable base plate, said rotating plate being mounted thereon, and a lift cylinder having a piston rod, said piston rod being operatively connected to said base plate to effect said rotation.

5. A method for joining ends of a printing ribbon, comprising the steps of positioning first and second ribbon ends in parallel, non-collinear positions on first and second plates in a common plate, said plates having adjacent spaced edges, said ribbon ends being further positioned at an oblique angle to said edges; cutting the ribbon ends at an oblique angle; rotating one of said plates out of the plane; repositioning said rotated plate by a combination of axial and rotational movement such that the ribbon ends overlap by a predetermined amount and the plates reside in a common plane; and welding the ribbon ends together.

6. The method of claim 5, wherein said cutting and welding steps are performed by a sonotrode in cooperation with a cutting anvil and a welding anvil, respectively.

7. The method of claim 6 further comprising the step of removing the waste ends produced by said cutting step by suction.

* * * * *

UNITED STATES PATENT AND TRADEMARK OFFICE
CERTIFICATE OF CORRECTION

PATENT NO. : 5,198,056
DATED : March 30, 1993
INVENTOR(S) : X. STOCKLI, J. MESSERLI It is certified that error appears in the above-identified patent and that said Letters Patent is hereby corrected as shown below:

Cover page, item 75,

"Fed. Rep. of Germany" to read

--Switzerland--.

Signed and Sealed this

Third Day of May, 1994

Attest:

BRUCE LEHMAN

Attesting Officer

Commissioner of Patents and Trademarks